(12) United States Patent
Wu et al.

(10) Patent No.: US 9,143,372 B2
(45) Date of Patent: Sep. 22, 2015

(54) COMMUNICATION SYSTEM WITH RECEIVER OPTIMIZATION MECHANISM AND METHOD OF OPERATION THEREOF

(71) Applicant: Samsung Electronics Co., Ltd., Gyeonggi-Do (KR)

(72) Inventors: Jinhong Wu, San Diego, CA (US); Mostafa El-Khamy, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/064,080

(22) Filed: Oct. 25, 2013

(65) Prior Publication Data
US 2014/0119483 A1  May 1, 2014

Related U.S. Application Data

(60) Provisional application No. 61/719,206, filed on Oct. 26, 2012.

(51) Int. Cl.
*H04L 27/06* (2006.01)
*H04L 25/03* (2006.01)
*H04L 25/06* (2006.01)

(52) U.S. Cl.
CPC .......... *H04L 27/06* (2013.01); *H04L 25/03006* (2013.01); *H04L 25/067* (2013.01)

(58) Field of Classification Search
CPC . H03M 13/05; H04B 17/004; H04B 17/0042; H04B 17/0057; H04B 17/0062; H04B 17/0075; H04B 17/008; H04L 25/03006; H04L 25/06; H04L 25/062; H04L 25/063; H04L 25/064; H04L 27/06; H04L 27/067; G06F 11/08; G06F 11/10
USPC ......... 375/241, 242, 253, 261, 262, 265, 320, 375/329, 332, 340, 341, 224, 225, 227, 375/346; 714/752, 758, 759, 792, 793, 794, 714/795
See application file for complete search history.

(56) References Cited

U.S. PATENT DOCUMENTS

| | | | |
|---|---|---|---|
| 7,567,635 B2 * | 7/2009 | Scheim et al. | 375/341 |
| 7,720,169 B2 * | 5/2010 | Reuven et al. | 375/267 |
| 8,418,019 B2 * | 4/2013 | Ivkovic et al. | 714/752 |
| 8,661,311 B2 * | 2/2014 | Yang et al. | 714/752 |
| 2005/0276317 A1 | 12/2005 | Jeong et al. | |
| 2006/0222124 A1 | 10/2006 | Kim et al. | |
| 2008/0163002 A1 | 7/2008 | Frederiksen | |
| 2011/0243020 A1 | 10/2011 | Ponnuswamy | |

(Continued)

OTHER PUBLICATIONS

Nguyen, T., Lampe, L., "Bit-interleaved coded modulation with mismatched decoding metrics", IEEE Trans. Commun., vol. 59, pp. 437-447, 2011.

(Continued)

*Primary Examiner* — Young T Tse
(74) *Attorney, Agent, or Firm* — IP Investment Law Group

(57) ABSTRACT

A communication system includes: an antenna unit configured to receive a receiver signal; a communication unit, coupled to the antenna unit, configured to: calculate a decoding result based on the receiver signal, generate a dynamic scalar based on the decoding result, and generate a content replication based on the dynamic scalar for communicating with a device.

20 Claims, 6 Drawing Sheets

(56) References Cited

U.S. PATENT DOCUMENTS

2011/0258508 A1* 10/2011 Ivkovic et al. .............. 714/752
2012/0173864 A1    7/2012 Schmidt et al.
2013/0191618 A1*  7/2013 Yang et al. .................. 712/220

OTHER PUBLICATIONS

Jalden J., Fertl, P., Matz, G., "On the generalized mutual information of BICM systems with approximate demodulation", IEEE Information Theory Workshop (ITW), pp. 1-5, 2010.

Milner, R., Rasmussesn, L., "Weighted extrinsic feedback in the iterative multiuser decoding of coded CDMA", In Communications Theory Workshop, 2006, Proceedings. 7th Austrailian, pp. 60-65, IEEE, 2006.

Wu, J., Ei-Khamy, M., Lee, J., Kang, I., "BICM Performance Improvement via Online LLR Optimization", 2013 IEEE Wireless Communications and Networking Conference, Apr. 7-10, 2013, pp. 3850-3855, IEEE, 2013.

* cited by examiner

COMMUNICATION SYSTEM WITH RECEIVER OPTIMIZATION MECHANISM AND METHOD OF OPERATION THEREOF

CROSS-REFERENCE TO RELATED APPLICATION(S)

This application claims the benefit of U.S. Provisional Patent Application Ser. No. 61/719,206 filed Oct. 26, 2012, and the subject matter thereof is incorporated herein by reference thereto.

TECHNICAL FIELD

An embodiment of the present invention relates generally to a communication system, and more particularly to a system with receiver optimization mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a communication system with receiver optimization mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system, including: an antenna unit configured to receive a receiver signal; a communication unit, coupled to the antenna unit, configured to: calculate a decoding result based on the receiver signal, generate a dynamic scalar based on the decoding result, and generate a final result based on the dynamic scalar for communicating with a device.

An embodiment of the present invention provides a method of operation of a communication system including: receiving a receiver signal with an antenna unit; calculating a decoding result based on the receiver signal; generating a dynamic scalar with a communication unit based on the decoding result; and generating a content replication based on the dynamic scalar for communicating with a device.

An embodiment of the present invention provides a non-transitory computer readable medium including instructions for operating a communication system including: receiving a receiver signal with an antenna unit; calculating a decoding result based on the receiver signal; generating a dynamic scalar based on the decoding result; and generating a content replication based on the dynamic scalar for communicating with a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
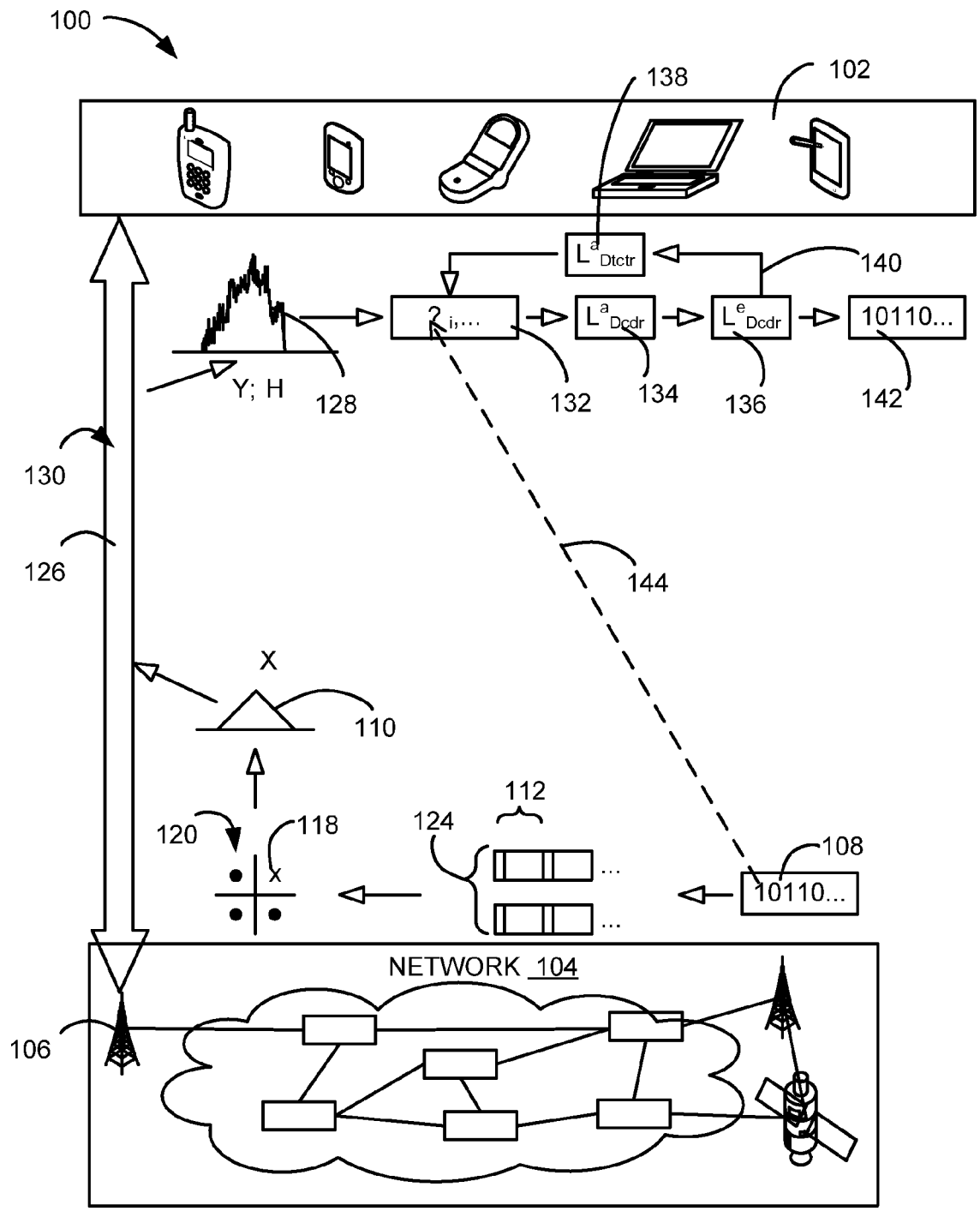
FIG. 1 is a communication system with receiver optimization mechanism in an embodiment of the present invention.

The following embodiments of the present invention can be used to process a receiver signal associated with communication content, including detection and decoding of digital signals that are channel encoded and bit-interleaved and modulated. The detection process and the decoding process can include imperfect demodulation or detection, errors in a channel estimate, or other sub-optimal components. For bit-interleaved coded modulation (BICM), a dynamic scalar including a dynamic base scalar, a forward scalar, a feedback scalar, or a combination thereof can be generated and applied to account for the imperfections and sub-optimal components.

The dynamic base scalar can improve BICM detector output values, such as a detection result, for channel decoding. The following embodiments of the present invention can use decoder decisions, such as a decoding result, to adaptively calculate the approximate generalized mutual information of each instance of a bit channel to generate the dynamic scalar. The dynamic scalar can be further utilized with a more complex detection-decoding scheme, such as an iterative-feedback mechanism.

An embodiment of the present invention can include the dynamic scalar generated dynamically or online providing improved accuracy for the signal processing results. The dynamic base scalar provides reduced complexity. The feedback scalar and the forward scalar each provides reduced complexity and reduced error rates.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a communication system 100 with flexible repeat-response mechanism in an embodiment of the present invention. The communication system 100 includes a first device 102, such as a mobile device including a cellular phone or a notebook computer, connected to a network 104. The network 104 is a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a second device 106 for directly linking and communicating with the first device 102. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a base station, can be included or with a cell tower, a wireless router, an antenna, a processing device, or a combination thereof being used to send signals to or receive signals from the first device 102, such as a smart phone or a laptop computer.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The second device 106 can communicate a communication content 108 by sending a transmitter signal 110 to the first device 102. The communication content 108 is data from a transmitting device intended for communication by reproduction or processing at a receiving device. For example, the communication content 108 can be a sequence of bits intended for displaying, audibly recreating, executing instructions, storing, or a combination thereof at a receiving device, such as the mobile station 102.

The second device 106 can modify the communication content 108 to generate and transmit the transmitter signal 110. The transmitter signal 110 is information actually transmitted by a device for communication and having a format for transmission. The second device 106 can generate the transmitter signal 110 by modifying, such as by interleaving or adding formatting information, the communication content 108 according to methods or standardizations predetermined by the communication system 100 to generate code words 112. The code words 112 are each units of information having a length predetermined by the communication system 100 for communicating information between devices.

For example, the transmitter signal 110 can be the code words 112 including a sequence of bits representing the communication content 108, an information portion and a parity portion. The information portion is the portion of the code words 112 corresponding to the communication content 108. The parity portion is information additional to and based on the communication content 108 for error prevention, error detection, error correction, or a combination thereof. The communication system 100 can determine and add the parity portion according to a method or standard predetermined by the communication system 100, a communication standard, or a combination thereof.

Also for example, the transmitter signal 110 can be a symbol 118 or a sequence thereof according to a modulation scheme 120, such as quadrature amplitude modulation (QAM) or phase-shift keying (PSK). The symbol 118 or the sequence thereof can correspond to the sequence of bits representing the communication content 108, the code words 112, or a combination thereof. The symbol 118 transmitted based on processing the communication content 108 can be represented as 'X'.

The transmitter signal 110 can include the code words 112 according to a transmission block 124. The transmission block 124 is a grouping of the code words 112 for transmitting between devices. For example, the transmission block 124 can be limitation on a quantity of the code words 112, a duration for transmission, a format for arrange information, or a combination thereof. The transmitter signal 110 can include one or more instances of the transmission block 124 grouping the code words 112 for representing the communication content 108.

The transmitter signal 110 can arrive at the mobile station 102 after traversing a transmitter channel 126. The transmitter channel 126 can be wireless, wired, or a combination thereof. The transmitter channel 126 can be a direct link between the first device 102 and the second device 106 or can include repeaters, amplifiers, or a combination thereof. For example, the transmitter channel 126 can include communication frequency, time slot, packet designation, transmission rate, channel code, or a combination thereof used for transmitting signals between the first device 102 and the second device 106.

The mobile station 102 can receive a receiver signal 128. The receiver signal 128 is information received by a device in the communication system 100. The receiver signal 128 can include the transmitter signal 110 that has been altered from traversing the transmitter channel 126. The receiver signal 128 can further include noise from the first device 102, the second device 106, or a combination thereof, interference signals from other devices and corresponding channel effects, or a combination thereof. The receiver signal 128 can be represented as 'Y'.

The communication system 100 can estimate a channel estimate 130 from the receiver signal 128. The channel estimate 130 is a description of changes to signals caused by the transmitter channel 126. The channel estimate 130 can describe and quantize reflection, loss, delay, refraction, obstructions, or a combination thereof a signal can experience while traversing between the second device 106 and the first device 102. The channel estimate 130 can be a matrix value characterizing the transmitter channel 126. The channel estimate 130 can be represented as 'H'. The channel estimate 130 can be a logarithmic-likelihood ratio (LLR) value.

The communication system 100 can process the channel estimate 130 and the receiver signal 128 to calculate a detection result 132. The detection result 132 is a result of detecting the symbol 118 in the receiver signal 128 corresponding to the transmitter signal 110. The detection result 132 can be represented as 'Λ'.

The detection result 132 can be an extrinsic information. The decoding result 136 can be approximated as:

$$L^e(b_i) \approx \max_{x:b_i=+1}\left(-|y-Hx|^2 + \frac{1}{2}\sum_{j\neq i}b_j L^a(b_j)\right) -$$

Equation (3)

-continued $$\max_{x:b_i=-1}\left(-|y-Hx|^2 + \frac{1}{2}\sum_{j\neq i}b_j L^a(b_j)\right).$$

The communication system 100 can use the detection result 132 to process a decoding input 134. The decoding input 134 is information initiating a decoding process for estimating or recovering the communication content 108. The decoding input 134 can be the detection result 132 or based on the detection result 132, such as a product of mathematical operation involving the detection result 132.

The decoding input 134 can be a-priori information for the decoding process. The decoding input 134 can be a prior knowledge for the decoding process about the communication content 108, the transmitter signal 110, the receiver signal 128, a symbol therein, a bit therein, or a combination thereof. The decoding input 134 can be a LLR value.

The decoding input 134 or the a-priori information can be represented as:

$$L^a(b_i) = \log\frac{p(b_i=+1)}{p(b_i=-1)}.$$

Equation (1)

The decoding input 134 can be a logarithmic result of a ratio between a probability that a certain bit or symbol within the receiver signal 128 had a transmitted value of +1 and a different probability that the same bit or symbol had a transmitted value of −1 or 0.

The decoding process can use the decoding input 134 to produce a-posteriori information. The a-posteriori information is a later or calculated knowledge for the base decoder module 326 about the communication content 108, the transmitter signal 110, the receiver signal 128, a symbol therein, a bit therein, or a combination thereof. The a-posteriori information can be a LLR value.

The a-posteriori information can be represented as:

$$L^A(b_i) = \log\frac{p(b_i=+1\mid y)}{p(b_i=-1\mid y)}.$$

Equation (2)

The a-posteriori information can be a logarithmic result of a ratio between a probability that a certain bit or symbol within the receiver signal 128 had a transmitted value of +1 given the receiver signal 128, and a different probability that the same bit or symbol had a transmitted value of −1 or 0 given the receiver signal 128.

The decoding process can further produce a decoding result 136. The decoding result 136 is new information for the decoding process, not derived from received information. The decoding result 136 can be calculated as the posteriori information, or as a difference between the a-priori information and the a-posteriori information, or a combination thereof. The decoding result 136 can be a LLR value.

The communication system 100 can include a detection feedback-input 138 based on the decoding result 136 for further detecting the symbol 118 in the receiver signal 128. The detection feedback-input 138 is information initiating a detection process for estimating or recovering the communication content 108. The detection feedback-input 138 can be the decoding result 136 or based on the detection result 132, such as a product of mathematical operation involving the decoding result 136.

The detection feedback-input 138 can be used as a-priori information for the detection process, as a prior knowledge for the detection process about the communication content 108, the transmitter signal 110, the receiver signal 128, a symbol therein, a bit therein, for a previous detection or decoding iteration, or a combination thereof. The detection feedback-input 138 can be a LLR value.

The communication system 100 can provide the detection feedback-input 138 for the detection process using an iterative-feedback mechanism 140. The iterative-feedback mechanism 140 is an architectural arrangement, a configuration, a set of instructions, or a combination thereof for iteratively detecting and decoding (IDD) the receiver signal 128. The iterative-feedback mechanism 140 can repeat the detection and decoding processes until a condition is satisfied.

The iterative-feedback mechanism 140 can be implemented in hardware, such as using feedback loops, memory, circuits, or a combination thereof, implemented in software, such as using loops, implemented in firmware, or implemented as a combination thereof. For example, the iterative detection-decoding scheme 514 can be the wiring, adder, shifter, register settings, a combination thereof, or a location or sequence thereof. Also for example, the iterative detection-decoding scheme 514 can be a threshold, a condition, an instruction set, a repeat mechanism, or a combination thereof.

The iterative-feedback mechanism 140 can further include the processing for the detection feedback-input 138. The iterative-feedback mechanism 140 can include the processing for the detection feedback-input 138 from the decoding result 136.

The detection process, the decoding process, or a combination thereof can use a turbo-code mechanism. The turbo-code mechanism can iteratively process information using a-priori, a-posterior, and extrinsic information for forward error correction. The turbo-code mechanism can utilize soft and hard decisions, implemented through LLR calculations and decisions for bit value, symbol value, or a combination thereof.

The detection feedback-input 138 used as a-priori information can be expressed as:

$$\Lambda_a = \Lambda_{APP} - \Lambda_{ch}.$$ Equation (4).

The term '$\Lambda_a$' can represent the detection feedback-input 138 used as a-priori information for the detection process utilizing the iterative-feedback mechanism 140. The term '$\Lambda_{APP}$' can represent the detection result 132 processed as a-posteriori LLR during the detection process. The term '$\Lambda_{ch}$' can represent the channel estimate 130 used as the channel LLR for the detection process.

The communication system 100 can use the detection process and the decoding process to produce a content replication 142. The content replication 142 can be an estimate or a reproduction of the communication content 108 based on the receiver signal 128. The content replication 142 can be used to operate the receiving device, such as by displaying the information represented by the communication content 108 or operating the device as intended by the communication content 108 for the first device 102 or the second device 106.

The communication system 100 can process for a bit channel 144. The bit channel 144 is a representation of influences and processes between an intended bit and a detected result. The bit channel 144 can be based on the symbol 118 grouping multiple instances of bits for transmission, each symbol experiencing different effects of the transmitter channel 126, processing each of the grouped bits in the detected symbol differently, or a combination thereof. The bit channel 144 can represent the influences and the processes between a bit in the communication content 108 and a corresponding value in the detection result 132.

Figure 2:
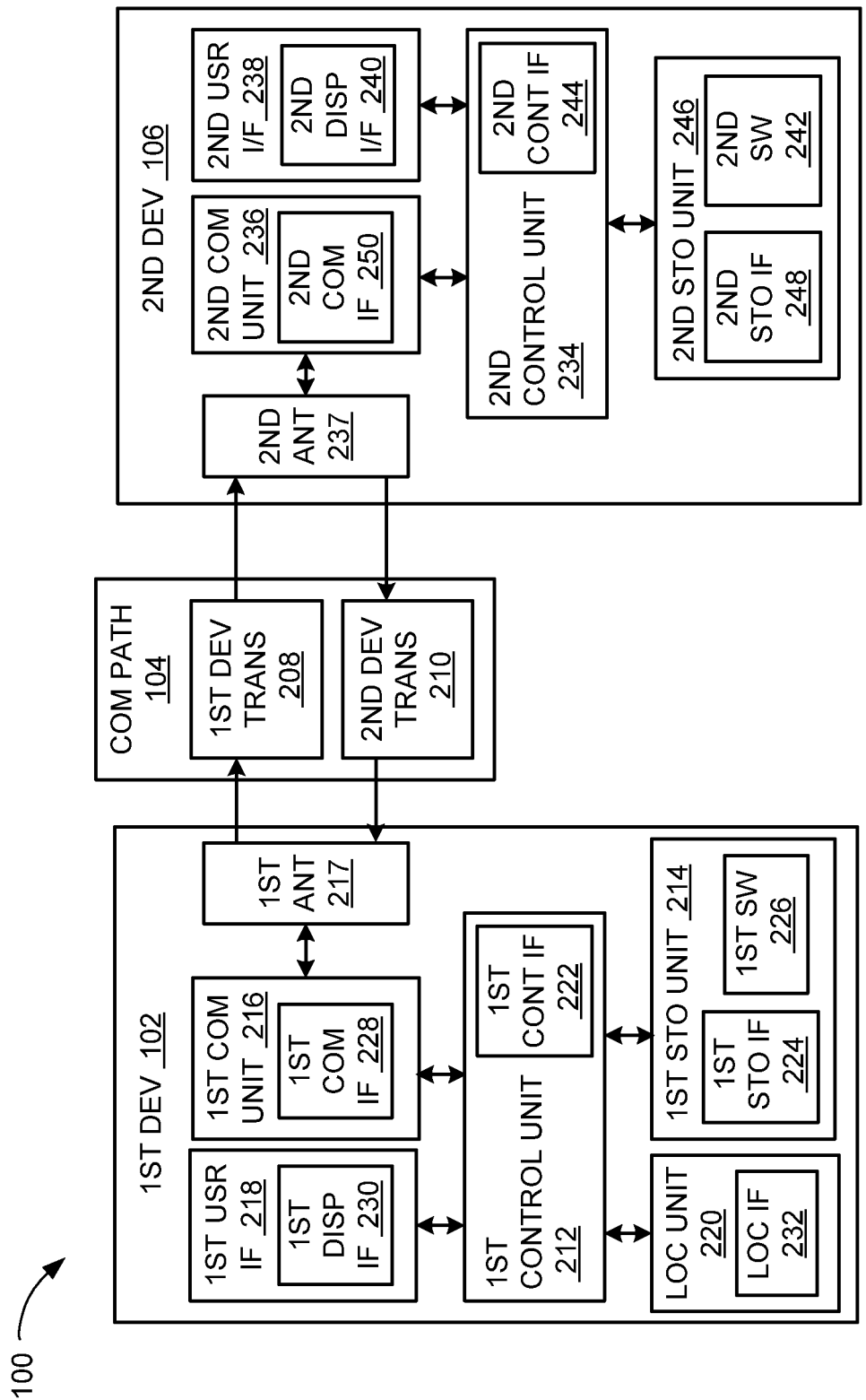
FIG. 2 is an exemplary block diagram of the communication system.

Referring now to FIG. 2, therein is shown an exemplary block diagram of the communication system 100. The communication system 100 can include the first device 102, the network 104, and the second device 106. The first device 102 can send information in a first device transmission 208 over the network 104 to the second device 106. The second device 106 can send information in a second device transmission 210 over the network 104 to the first device 102.

Referring now to FIG. 2, therein is shown an exemplary block diagram of the communication system 100. The communication system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218, and a location unit 220. The first control unit 212 can include a first control interface 222. The first control unit 212 can execute a first software 226 to provide the intelligence of the communication system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first communication unit 216 can enable external communication to and from the first device 102. For example, the first communication unit 216 can permit the first device 102 to communicate with the second device 106, a different device, an attachment, such as a peripheral device or a desktop computer, the network 104, or a combination thereof.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first antenna unit 217. The first antenna unit 217 can be a device or a portion of a device for physically communicating signals. The first antenna unit 217 can communicate by transmitting or receiving signals to or from another device. The first antenna unit 217 can be for wireless signals. The first antenna unit 217 can include an omnidirectional antenna, a wire, an antenna chip, a ceramic antenna, or a combination thereof.

The first antenna unit 217 can detect or respond to a power in electromagnetic waves and provide the detected result to the first communication unit 216 to receive a signal, including the second device transmission 210. The first antenna unit 217 can provide a path or respond to currents or voltages provided by the first communication unit 216 to transmit a signal, including the first device transmission 208. The first antenna unit 217 can include one or more than one receiving or transmitting structures, including a grouping of antennas, such as for multiple-input multiple-output (MIMO) type of communication.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first control unit 212 can operate the first user interface 218 to display information generated by the communication system 100. The first control unit 212 can also execute the first software 226 for the other functions of the communication system 100, including receiving location information from the location unit 220. The first control unit 212 can further execute the first software 226 for interaction with the network 104 via the first communication unit 216.

The first control unit 212 can operate the first user interface 218 to display information generated by the communication system 100. The first control unit 212 can also execute the first software 226 for the other functions of the communication system 100, including receiving location information from the location unit 220. The first control unit 212 can further execute the first software 226 for interaction with the communication path 104 via the first communication unit 216.

The location unit 220 can generate location information, current heading, current acceleration, and current speed of the first device 102, as examples. The location unit 220 can be implemented in many ways. For example, the location unit 220 can function as at least a part of the global positioning system, an inertial computing system, a cellular-tower location system, a pressure location system, or any combination thereof. Also, for example, the location unit 220 can utilize components such as an accelerometer or GPS receiver.

The location unit 220 can include a location interface 232. The location interface 232 can be used for communication between the location unit 220 and other functional units in the first device 102. The location interface 232 can also be used for communication external to the first device 102.

The location interface 232 can receive information from the other functional units or from external sources, or can transmit information to the other functional units or to external destinations. The external sources and the external destinations refer to sources and destinations external to the first device 102.

The location interface 232 can include different implementations depending on which functional units or external units are being interfaced with the location unit 220. The location interface 232 can be implemented with technologies and techniques similar to the implementation of the first control unit 212.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, a second user interface 238, and a second storage unit 246.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can operate the second user interface 238 to display information. The second control unit 234 can also execute the second software 242 for the other functions of the communication system 100, including operating the second communication unit 236 to communicate with the first device 102 over the network 104.

The second control unit 234 can operate the second user interface 238 to display information. The second control unit 234 can also execute the second software 242 for the other functions of the communication system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the communication system 100 is shown with the second storage unit 246 as a single hierarchy storage system, although it is understood that the communication system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as nonvolatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or resistors, for interaction with the network 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or resistors, for interaction with the communication path 104.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The second communication unit 236 can be coupled with a second antenna unit 237. The second antenna unit 237 can be a device or a portion of a device for physically communicating signals. The second antenna unit 237 can communicate by transmitting or receiving signals to or from another device. The second antenna unit 237 can be for wireless signals. The second antenna unit 237 can include an omnidirectional antenna, a wire, an antenna chip, a ceramic antenna, or a combination thereof.

The second antenna unit 237 can detect or respond to a power in electromagnetic waves and provide the detected result to the second communication unit 236 to receive a signal, including the first device transmission 208. The second antenna unit 237 can provide a path or respond to currents or voltages provided by the second communication unit 236 to transmit a signal, including the second device transmission 210. The second antenna unit 237 can include one or more than one receiving or transmitting structures, including a grouping of antennas, such as for multiple-input multiple-output (MIMO) type of communication.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The communication system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units in the second device 106 can work individually and independently of the other functional units. The second device 106 can work individually and independently from the first device 102 and the communication path 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the communication system 100 is described by operation of the first device 102 and the second device 106. It is understood that the first device 102 and the second device 106 can operate any of the modules and functions of the communication system 100.

Figure 3:
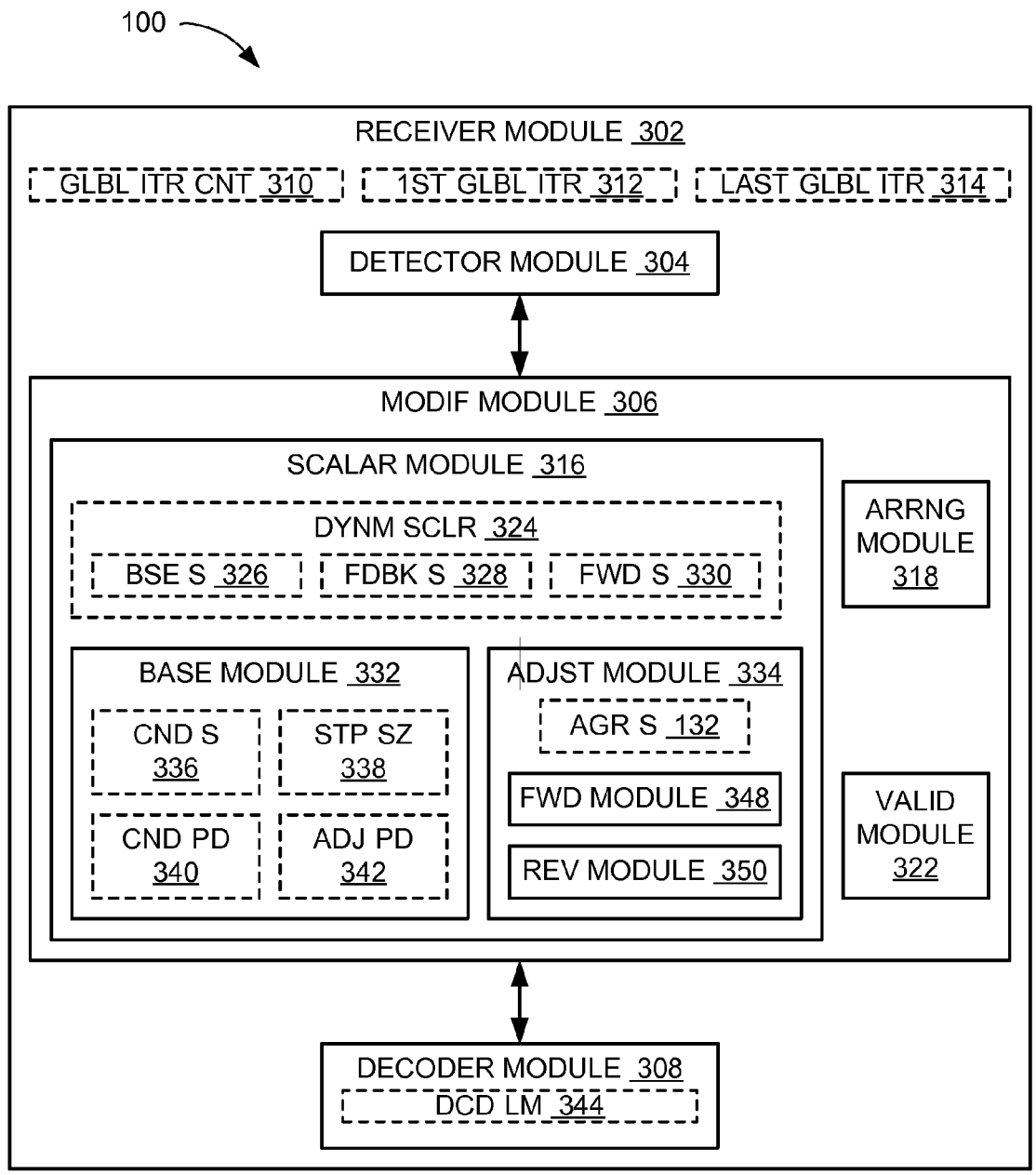
FIG. 3 is a control flow of the communication system.

Referring now to FIG. 3, therein is shown a control flow 300 of the communication system 100. The communication system 100 can include a receiver module 302. The communication system 100 can include a detector module 304, a modification module 306, a decoder module 308, or a combination thereof. The receiver module 302 can include the detector module 304, the modification module 306, the decoder module 308, or a combination thereof.

The detector module 304 can be coupled to the modification module 306, and the modification module 306 can be coupled to the decoder module 308. The modules can be coupled to each other in a variety of ways. For example, modules can be coupled by having the input of one module connected to the output of another, such as by using wired or wireless connections, the network 104 of FIG. 1, instructional steps, process sequence, or a combination thereof.

As a more specific example, one or more outputs of the detector module 304 can be connected to one or more inputs of the modification module 306 using conductors or wireless communication devices. Also as a more specific example, one or more outputs of the modification module 306 can be connected to one or more inputs of the decoder module 308.

The communication system 100 can communicate with a device, such as by displaying images, recreating sounds, exchanging process steps or instructions, or a combination thereof. The communication system 100 can initiate the communication by sending information from a transmitting device to a receiving device.

The receiver module 302 is configured to receive and process the information sent from a different device. For example, the receiver module 302 can receive and process the information from the second device 106 of FIG. 1 for the first device 102 of FIG. 1 or receive and process the information from the first device 102 for the second device 106.

The receiver module 302 can receive communicated information by receiving the receiver signal 128 of FIG. 1. The receiver module 302 can receive the receiver signal 128 corresponding to the transmitter signal 110 of FIG. 1, after the transmitter signal 110 traverses through the transmitter channel 126 of FIG. 1. The receiver module 302 can use the first antenna unit 217 of FIG. 2, the second antenna unit 237 of FIG. 2, or a combination thereof to receive the receiver signal 128.

The receiver module 302 can further process the receiver signal 128 to determine the content replication 142 of FIG. 1 corresponding to the communication content 108 of FIG. 1. The communication system 100 or the receiving device therein can use the content replication 142 to complete the communication.

The receiver module 302 can include the iterative-feedback mechanism 140 of FIG. 1 to process the receiver signal 128. The receiver module 302 can include a global iteration count 310 for tracking the iterative processing. For example, the global iteration count 310 can track the interaction between the detection process and the decoding process. Also for example, the global iteration count 310 can track the instances of the symbol 118 of FIG. 1, a bit therein, or a combination thereof.

The receiver module 302 can highlight a first global iteration 312, a last global iteration 314, or a combination thereof. The receiver module 302 can have a process specific to the first global iteration 312, the last global iteration 314, or a combination thereof. Details regarding the processing based on the first global iteration 312 and the last global iteration 314 will be described below.

The receiver module 302 can be implemented in hardware, software, or a combination thereof. The receiver module 302 can use the first antenna unit 217, the second antenna unit 237, the first communication unit 216 of FIG. 2, the second communication unit 236 of FIG. 2, the first control unit 212 of FIG. 2, the second control unit 234 of FIG. 2, or a combination thereof to receive and process the receiver signal 128. The receiver module 302 can also be implemented as a portion in the first communication unit 216, the second communication unit 236, the first control unit 212, the second control unit 234, or a combination thereof.

The communication system 100 can use the content replication 142 as an approximation or an estimation of the communication content 108 originally intended for communication between devices. For example, the first device 102 or the second device 106 receiving the receiver signal 128 can operate the first device 102 or the second device 106, such as by controlling components therein, displaying images, recreating sounds, performing instructions, performing calculations or further processes, or a combination thereof corresponding to the communication content 108 based on the content replication 142.

The detector module 304 is configured to identify the receiver signal 128. The detector module 304 can receive or identify the receiver signal 128 for representing the communication content 108 by detecting, recording, or a combination thereof for voltage or current changes sourced by the first antenna unit 217, the second antenna unit 237, or a combination thereof.

The detector module 304 can further analyze the transmitter channel 126 of FIG. 1. The detector module 304 can analyze the transmitter channel 126 by determining the channel estimate 130 of FIG. 1. The detector module 304 can determine the channel estimate 130 by analyzing the reference portion of the receiver signal 128. The detector module 304 can compare the reference portion of the receiver signal 128 with the transmitted instance of the reference portion.

For example, the detector module 304 can determine the channel estimate 130 as a difference in amplitude, phase, frequency, signal shape, power, or a combination thereof between the reference portion of the receiver signal 128 and the transmitted instance of the reference portion. The transmitted instance of the reference portion can be predetermined by the communication system 100 or a communication standard.

The detector module 304 can analyze the receiver signal 128 for sequence of the symbol 118 by calculating likelihood values. The detector module 304 can calculate the detection result 132 of FIG. 1 based on the receiver signal 128 using the likelihood values. The detection result 132 can be a likelihood value or a set of likelihood values for one or more portions in the receiver signal 128 corresponding to a particular value or instance for the symbol 118 in the modulation scheme 120 of FIG. 1.

The detector module 304 can calculate the detection result 132 for representing a likelihood or a set of likelihoods that a portion of the receiver signal 128 was transmitted as a particular value or instance of the symbol 118. The detector module 304 can calculate a LLR value for the one or more portions of the receiver signal 128.

The detector module 304 can calculate the set of likelihood values having a likelihood value corresponding to each symbol in the modulation scheme 120 for all possible instances of the symbol 118 according to the modulation scheme 120. The detector module 304 can calculate the detection result 132 as one or more measures of confidence levels associated with a likely transmitted symbol or likelihoods for all possible symbols, or the associated bit values, corresponding to the analyzed portion in the receiver signal 128.

The detector module 304 can calculate the detection result 132 based on the receiver signal 128 using a variety of ways. For example, the detector module 304 can use using Equation (3) to calculate the detection result 132. Also as an example, the detector module 304 can be a maximum-likelihood detector, a linear estimator, such as a minimum mean square error estimator or a zero-forcing estimator, or an interference-cancelling detector. Also as an example, the detector module 304 can be a non-interference cancelling detector but an interference-aware or an interference-processing detector.

The detector module 304 can use or be implemented in the first communication unit 216, the second communication unit 236, the first control unit 212, the second control unit 234, or a combination thereof for the detection process. The detector module 304 can store the results, intermediate values, or a combination thereof from the detection process in the first communication unit 216, the second communication unit 236, the first storage unit 214 of FIG. 2, the second storage unit 246 of FIG. 2, or a combination thereof.

After the detection process, the control flow 300 can be passed to the modification module 304. The control flow 300 can pass through a variety of ways. For example, control flow 300 can pass by having processing results of one module passed to another module, such as by passing the detection result 132 from the detector module 304 to the modification module 306, by storing the processing results at a location known and accessible to the other module, such as by storing the detection result 132 at a storage location known and accessible to the modification module 306, by notifying the other module, such as by such as by using a flag, an interrupt, a status signal, or a combination for the modification module 306, or a combination of processes thereof.

The modification module 306 is configured to process the results of the decoding process and the detection process. The modification module 306 can process the results by generating scalar values based on the results, applying the generated scalar values, interleaving the information, de-interleaving the information, performing error checks, or a combination thereof. The modification module 306 can include a scaling module 316, an arrangement module 318, a validation module 322, or a combination thereof for processing the results.

The scaling module 316 is configured to generate scalar values based on the results of the decoding process and the detection process. Details regarding the scaling module 316 will be described below.

The arrangement module 318 is configured to modify the decoding result 136, the detection result 132, or a combination thereof. The arrangement module 318 can modify by rearranging the order to change the sequence of likelihood values, bits, symbols, or a combination thereof, removing or adding certain information, scrambling or descrambling the sequence, or a combination of operations thereof.

The arrangement module 318 can interleave, rearrange, remove or add, scramble or descramble based on pattern or format predetermined by the communication system 100, a communication standard, a coding scheme, or a combination thereof. The arrangement module 318 can modify the detection result 132 to generate the decoding input 134, modify the decoding result to generate the detection feed-back input 138, or a combination thereof.

The validation module 322 is configured to check the processing results. The validation module 322 can perform an error check, such as cyclic redundancy check (CRC), check sum error check, low-density parity-check (LDPC), or a combination thereof for a candidate data based on the decoding result 136.

The validation module 322 can generate the content replication 142 for estimating the communication content 108 as the candidate data having a sequence of bits corresponding to the decoding result 136 when the error check produces a passing result. The validation module 322 can generate the content replication 142 based on the candidate data processed based on a dynamic scalar 324, including a dynamic base scalar 326, a forward scalar 328, a feedback scalar 330, or a combination thereof combined with the detection result 132, the decoding result 136, or a combination thereof.

The validation module 322 can stop the decoding process, the detection process, or both when the candidate data passes the error check. The validation module 322 can continue the decoding process, the detection process, or a combination thereof when the candidate data does not pass the error check.

For the first global iteration 312, the modification module 306 can use the arrangement module 318, without using the scaling module 316 and the validation module 322. After interleaving the detection result 132 to generate the decoding input 134, the control flow 300 can be passed to the decoder module 308. The control flow 300 can pass similarly as described above between the detector module 304 and the modification module 306, but using the processing results of the modification module 306, such as the decoding input 134.

The decoder module 308 is configured to further analyze for individual symbols or bits within the receiver signal 128, or a derivation thereof. The decoder module 308 can further analyze the output of the detector module 304, including the detection result 132 or a derivation thereof, such as the decoding input 134 from the modification module 306.

The decoder module 308 can calculate the decoding result 136 based on the receiver signal 128 using a variety of ways. As an example, the decoder module 308 can calculate the decoding result 136 using Equation (3), similar to the detector module 304 described above. Also as an example, the decoder module 308 can utilize a logarithmic maximum a-posteriori (log-MAP) scheme or a maximum logarithmic MAP (MLM) scheme to calculate the decoding result 136.

The decoder module 308 can use or be implemented in the first communication unit 216, the second communication unit 236, the first control unit 212, the second control unit 234, or a combination thereof for the decoding process. The decoder module 308 can store the results, intermediate values, or a combination thereof from the decoding process in the first communication unit 216, the second communication unit 236, the first storage unit 214, the second storage unit 246, or a combination thereof.

The control flow 300 can be passed to the modification module 306 after decoding the receiver signal 128 using the decoding input 134, such as for the first global iteration 312 or in a module without the iterative-feedback mechanism 140 or other higher order processing mechanism. The modification module 306 can use the arrangement module 318 to scramble or interleave the decoding result 136. The modification module 306 can alternatively process the decoding input 134 for scalar values without the scrambling or interleaving process.

The modification module 306 can use the validation module 322 to perform an error check on the initial instance of the decoding result 136. Based on failing results of the validation module 322, the modification module 306 can be configured to use the scaling module 316 to generate the dynamic scalar 324. The dynamic scalar 324 is a number or a vector for adjusting results or inputs. The dynamic scalar 324 can be generated based on the decoding result 136, the detection result 132, the channel estimate 130, or a combination thereof dynamically or online, such as after receiving the receiver signal 128, after or during the decoding process, or processes associated thereto.

It has been discovered that the dynamic scalar 324 generated dynamically or online provides improved accuracy for the signal processing results. Generating the dynamic scalar 324 dynamically can use real-time results to compensate for the sub-optimal characteristics of the detection process or the decoding process instead of values calculated offline. The dynamic or online calculation provides increased accuracy for the extrinsic information, which leads to lower error rates and faster processing time.

The scaling module 316 can include a base module 332, an adjustment module 334, or a combination thereof. The base module 332 can be used for the first global iteration 312. The base module 332 is configured to generate the dynamic scalar 324 including a dynamic base scalar 326. The dynamic base scalar 326 can be used with or without the iterative-feedback mechanism 140 of FIG. 1. The dynamic base scalar 326 can correspond to the first global iteration 312. The dynamic base scalar 326 can correspond to each instance of the bit channel 144 of FIG. 1.

The base module 332 can include a candidate scalar 336 and a step size 338. The candidate scalar 336 can be used as an input value for processing the decoding result 136, the detection result 132, the channel estimate 130, or a combination thereof for the dynamic base scalar 326. The base module 332 can initialize the candidate scalar 336, represented as 's', to 1.0 and the step size 338, represented as 'a', to 1.05.

The base module 332 can calculate a candidate product 340 and an adjacent product 342. The base module 332 can calculate the candidate product 340 corresponding to the candidate scalar 336, and calculate the adjacent product 342 corresponding to the product of the candidate scalar 336 and the step size 338. The candidate product 340 can be represented as '$\hat{I}_{qB_i,Y}(s)$', and the adjacent product 342 can be represented as '$\hat{I}_{qB_i,Y}(\alpha s)$'.

The candidate product 340 and the adjacent product 342 can be calculated using:

$$\hat{I}_{qB_i,Y}(s) = 1 - E_{X,Y}\{\log_2(1+\exp(-\text{sgn}(\hat{b}_i(X))\Lambda_{qB_i,Y}(Y)s))\}. \quad \text{Equation (4)}.$$

The candidate product 340 and the adjacent product 342 can be calculated using an approximation of:

$$\hat{I}_{qB_i,Y}(s) \approx 1 - \frac{1}{N_i}\sum_{n=0}^{N_i-1} \log_2\left(1 + \exp\left(-\text{sgn}(\hat{b}_{i,n})\right)\Lambda_{i,n}s\right). \quad \text{Equation (5)}$$

The base module 332 can calculate the candidate product 340 and the adjacent product 342 based on the decoding result 136, expressed as '$\hat{b}_i(X)$'. The decoding result 136 can include an initial decoder hard decision for providing the estimate for '$b_i(X)$'. A demodulator output LLR associated with the channel estimate 130 can be expressed as '$\Lambda_{qB_i,Y}(Y)$'.

The base module 332 can generate the dynamic scalar 324 including the dynamic base scalar 326 based on comparing the candidate product 340 to the adjacent product 342. The base module 332 can invert the step size 338 when the candidate product 340 is greater than the adjacent product 342, which can be represented as:

$$\alpha = \frac{1}{\alpha}, \text{ when } \hat{I}_{qB_i,Y}(s) > \hat{I}_{qB_i,Y}(\alpha s). \qquad \text{Equation (6)}$$

The base module 332 can set the value of the candidate product 340 as the adjacent product 342 and set the value of the candidate scalar 336 as a product of the candidate scalar 336 and the step size 338 when the candidate product 340 is not greater than the adjacent product 342, which can be represented as:

$$\hat{I}_{qB_i,Y}(s) = \hat{I}_{qB_i,Y}(\alpha s), \text{ and } s = \alpha s, \text{ when } \hat{I}_{qB_i,Y}(s) \le \hat{I}_{qB_i,Y}(\alpha s) \qquad \text{Equation (7)}.$$

The base module 332 can further calculate the adjacent product 342. The base module 332 can further generate the dynamic scalar 324 including the dynamic base scalar 326 based on comparing the candidate product 340 to the adjacent product 342. The base module 332 can set the dynamic base scalar 326 when the candidate product 340 is greater than or equal to the adjacent product 342, which can be represented as:

$$s_i = \frac{s + \alpha s}{2}, \text{ when } \hat{I}_{qB_i,Y}(s) \ge \hat{I}_{qB_i,Y}(\alpha s). \qquad \text{Equation (8)}$$

The base module 332 can return the dynamic base scalar 326 corresponding to the bit channel 144, represented as '$s_i$'.

The base module 332 can otherwise set the value of the candidate product 340 as the adjacent product 342 and set the value of the candidate scalar 336 as a product of the candidate scalar 336 and the step size 338 when the candidate product 340 is not greater than or equal to the adjacent product 342. The base module 332 can repeat the calculation of the adjacent product 342, the further comparison between the adjacent product 342 and the candidate product 340 until the candidate product 340 is greater than or equal to the adjacent product 342. The base module 332 can then generate the dynamic base scalar 326 as described in Equation (8).

The dynamic scalar 324 or the dynamic base scalar 326 therein can be determined by determining the candidate scalar 336 and the step size 338 maximizing the candidate product 340, which can be based on iteratively incrementing the candidate scalar 336 and comparing the candidate product 340 and the adjacent product 342. The dynamic scalar 324 or the dynamic base scalar 326 therein can be generated for the first global iteration 312 or after the first global iteration 312.

The iterative process for the base module 332 can be associated with a generalized mutual information (GMI). The GMI can be represented as:

$$I_{qB_iY}^{gmi} = \max_{s>0} \hat{I}_{qB_i,Y}(s). \qquad \text{Equation (9)}.$$

The iterative process described above for the base module 332 can generate the dynamic scalar 324 or the dynamic base scalar 326 therein for maximizing the GMI for each instance of the bit channel 144, which can be expressed as:

$$s_i = \text{argmax}_{s>0} \hat{I}_{qB_i,Y}(s). \qquad \text{Equation (10)}.$$

It has been discovered that the dynamic base scalar 326 provides reduced complexity. The dynamic base scalar 326 directly based on the decoding result 136 can provide estimates of true transmitted data using real time and actual data. The dynamic base scalar 326 directly generated dynamically and online can reduce or eliminate extensive look up tables that account for sensitivity of the optimal scaling factors. Further the dynamic base scalar 326 for maximizing the approximated GMI, as in Equation (5) can account for fast changing transmission environments.

The base module 332 can combine the dynamic scalar 324 or the dynamic base scalar 326 therein with the detection result 132, the decoding result 136, or a combination thereof. The base module 332 can combine or apply the scalar for further decoding the receiver signal 128, such as for calculating the decoding result 136. The base module 332 can scale the LLR by the dynamic scalar 324 or the dynamic base scalar 326 therein per bit channel, which can be represented as:

$$\Lambda_{i,n} \leftarrow s_i \Lambda_{i,n}. \qquad \text{Equation (11)}.$$

The base module 332 can combine the dynamic scalar 324 or the dynamic base scalar 326 therein after rate matching, descrambling and de-interleaving processes, and without the scrambling or interleaving process going from the decoder module 308 to the base module 332. The channel LLRs after the rate matching, the descrambling and the de-interleaving processes may not align sequentially according to the bit channel order of the modulation scheme 120.

The base module 332 can apply a specific instance of the dynamic scalar 324 or the dynamic base scalar 326 therein for individual instances of the bit channel 144. The across base module 332 can also apply a specific instance of the dynamic scalar 324 or the dynamic base scalar 326 therein for all instances of the bit channel 144 in the receiver signal 128, such as corresponding to the code words 112 of FIG. 1 or the transmission block 124 of FIG. 1.

The base module 332 can further divide the LLRs corresponding to each instance of the bit channel 144 into multiple sub-groups. The base module 332 can calculate one instance of the dynamic scalar 324 or the dynamic base scalar 326 therein for each of the sub-groups. For example, all negative LLRs and all positive LLRs of one instance of the bit channel 144 can form two separate groups. An instance of the dynamic scalar 324 or the dynamic base scalar 326 therein for each group can be found to maximize the combined GMI.

The base module 332 can use the first communication unit 216, the second communication unit 236, the first control unit 212, the second control unit 234, or a combination thereof for generating the dynamic scalar 324 or the dynamic base scalar 326 therein. The base module 332 can use store the results, intermediate values, or a combination thereof from generating the scalar in the first communication unit 216, the second communication unit 236, the first storage unit 214, the second storage unit 246, or a combination thereof. The base module 332 can also be implemented as a portion in the first communication unit 216, the second communication unit 236, the first control unit 212, the second control unit 234, or a combination thereof.

After generating and applying the dynamic scalar 324, the control flow 300 can be passed to the decoder module 308. The control flow 300 can pass similarly as described above between the detector module 304 and the modification module 306, but using the processing results of the modification module 306, such as the dynamic scalar 324 or the dynamic base scalar 326 therein.

The decoder module 308 can continue the decoding process using the decoding input 134 resulting from combining the dynamic scalar 324 or the dynamic base scalar 326 therein with the detection result 132, the decoding result 136, or a combination thereof. The decoder module 308 can finish the decoding process to calculate an updated instance of the decoding result 136.

The decoder module 308 can continue the decoding process based on a decoding limit 344. The decoding limit 344 can be a maximum number of iterations for the decoding process. For example, the decoding limit 344 can be set to any number greater than 1, such as 8. The decoding limit 344 can be associated with the code words 112, the symbol 118, the transmission block 124, a communication protocol, a coding convention, or a combination thereof.

After finishing the decoding process, the control flow 300 can be passed to the arrangement module 318. The control flow 300 can pass similarly as described above between the detector module 304 and the modification module 306, but using the processing results of the decoder module 308, such as the decoding result 136.

The arrangement module 318 can scramble, interleave, or a combination thereof for the decoding result 136. The arrangement module 318 can calculate the detection feedback-input 138 by processing the decoding result 136. The detection feedback-input 138 can be an extrinsic information for the decoder module 308 and can also be used as a-priori information for the detector module 304.

The modification module 306 can further include the adjustment module 334 for processing information between the detector module 304 and the decoder module 308. The adjustment module 334 is configured to generate the dynamic scalar 324 including the forward scalar 328, the feedback scalar 330, or a combination thereof. The adjustment module 334 can generate the forward scalar 328, the feedback scalar 330, or a combination thereof by calculating an aggregate scalar 346.

The aggregate scalar 346 is a combination of or an average of the dynamic base scalar 326 across all instances of the bit channel 144. The aggregate scalar 346, represented as '$\bar{S}$', can be expressed as:

$$\bar{S} = \frac{1}{m}\sum_{i=1}^{m} s_i.$$ Equation (12)

The adjustment module 334 can include a forward module 348, a reverse module 350, or a combination thereof for generating the dynamic scalar 324. The reverse module 350 is configured to generate the dynamic scalar 324 including the feedback scalar 330. The reverse module 350 can generate the dynamic scalar 324 including the feedback scalar 330 based on the dynamic base scalar 326.

The reverse module 350 can generate the feedback scalar 330 when the global iteration count 310 is not the last global iteration 314. The reverse module 350 can generate the feedback scalar 330 as a factored inverse of the aggregate scalar 346. The feedback scalar 330 can be represented as $$\frac{`a'}{\bar{S}}.$$

The factor 'a' can be any positive number, including decimal. For example, the factor 'a' can be any number between 0 and 1.

The reverse module 350 can combine, such as by multiplying, the detection result 132, the decoding result 136, the detection feedback-input 138, or a combination thereof with the feedback scalar 330. For example, the reverse module 350 can update the detection feedback-input 138 by applying the feedback scalar 330. The reverse module 350 can combine the detection result 132 in the form of the detection feedback-input 138 and the feedback scalar 330 for calculating a different instance of the detection result 132. The combining process can be expressed as:

$$\Lambda_{i,n} \leftarrow \frac{a}{\bar{S}}\Lambda_{i,n}.$$ Equation (13)

It has been discovered that the feedback scalar 330 provides reduced complexity and reduced error rates. The feedback scalar 330 directly generated dynamically and online can reduce or eliminate extensive look up tables that account for sensitivity of the optimal scaling factors. Further, the feedback scalar 330 can further compensate for sub-optimal decoders in providing information to the detector.

The reverse module 350 can use the first communication unit 216, the second communication unit 236, the first control unit 212, the second control unit 234, or a combination thereof for generating the dynamic scalar 324 or the feedback scalar 330 therein. The reverse module 350 can store the results, intermediate values, or a combination thereof from generating the scalar in the first communication unit 216, the second communication unit 236, the first storage unit 214, the second storage unit 246, or a combination thereof. The reverse module 350 can also be implemented as a portion in the first communication unit 216, the second communication unit 236, the first control unit 212, the second control unit 234, or a combination thereof.

The reverse module 350 can generate the feedback scalar 330 for calculating the detection result 132 for the iterative-feedback mechanism 140. After generating and applying the dynamic scalar 324 including the feedback scalar 330, the control flow 300 can be passed to the detector module 304 similarly as described above between the detector module 304 and the modification module 306. The control flow 300 can pass using the detection feedback-input 138. The detector module 304 can use the detection feedback-input 138 as an a-priori information for the detection process.

After the detection process and after the first global iteration 312, the scaling module 316 can use the adjustment module 334 to calculate the dynamic scalar 324 instead of the base module 332. The adjustment module 334 can use the forward module 348 to calculate the dynamic scalar 324 including the forward scalar 328. The forward module 348 is configured to generate the dynamic scalar 324 including the forward scalar 328.

The forward module 348 can generate the forward scalar 328 when the global iteration count 310 is not the first global iteration 312. The forward module 348 can generate the forward scalar 328 based on the dynamic base scalar 326 generated during the first global iteration 312. The forward module 348 can generate the forward scalar 328 as the value of the aggregate scalar 346. The forward module 348 can combine or apply the forward scalar 328 to the detection result 132, the decoding result 136, the decoding input 134, or a combination thereof as described above. The combining process can be expressed as:

$$\Lambda_{i,n} \leftarrow \bar{S}\Lambda_{i,n}.$$ Equation (13).

It has been discovered that the forward scalar 328 provides reduced complexity and error rates. The forward scalar 328 directly generated dynamically and online can reduce or eliminate extensive look up tables that account for sensitivity of the optimal scaling factors. Further, the forward scalar 328 can further compensate for sub-optimal detectors without reapplying the iterative process after the first global iteration 312.

The forward module 348 can use the first communication unit 216, the second communication unit 236, the first control unit 212, the second control unit 234, or a combination thereof for generating the dynamic scalar 324 or the forward scalar 328 therein. The forward module 348 can store the results, intermediate values, or a combination thereof from generating the scalar in the first communication unit 216, the second communication unit 236, the first storage unit 214, the second storage unit 246, or a combination thereof. The forward module 348 can also be implemented as a portion in the first communication unit 216, the second communication unit 236, the first control unit 212, the second control unit 234, or a combination thereof.

The forward module 348 can generate the feedback scalar 330 for calculating the decoding result 136. After generating and applying the dynamic scalar 324 including the forward scalar 328, the control flow 300 can be passed to the decoder module 304 similarly as described above between the detector module 304 and the modification module 306. The iterative process described above can continue until the validation module 322 determines a passing result for the error check process or until the last global iteration 314.

The modules described in this application can be hardware implementation or hardware accelerators, including passive circuitry, active circuitry, or both, in the first control unit 216, in the second control unit 238, the first communication unit 216, the second communication unit 236, or a combination thereof. The modules can also be hardware implementation or hardware accelerators, including passive circuitry, active circuitry, or both, within the first device 102 or the second device 106 but outside of the first control unit 216, in the second control unit 238, the first communication unit 216, or the second communication unit 236.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 214, the second storage unit 246, the first communication unit 216, the second communication unit 236, or a combination thereof can represent the non-transitory computer readable medium. The first storage unit 214, the second storage unit 246, the first communication unit 216, the second communication unit 236, or a portion therein can be removable from the first device 102 or the second device 106. Examples of the non-transitory computer readable medium can be a non-volatile memory card or stick, an external hard disk drive, a tape cassette, or an optical disk.

The physical transformation from the dynamic scalar 324 results in the movement in the physical world, such as content displayed or recreated for the user on the first device 102. The content, such as navigation information or voice signal of a caller, reproduced on the first device 102 can influence the user's movement, such as following the navigation information or replying back to the caller. Movement in the physical world results in changes to the transmitter channel 126 and a new instance of the communication content 108, which can be fed back into the communication system 100 to process the receiver signal 128 and the dynamic scalar 324.

The control flow 300 or the method 300 of operation of the communication system 100 includes: receiving a receiver signal with an antenna unit; calculating a decoding result based on the receiver signal; generating a dynamic scalar with a communication unit based on the decoding result; and generating a content replication based on the dynamic scalar for communicating with a device.

Figure 4:
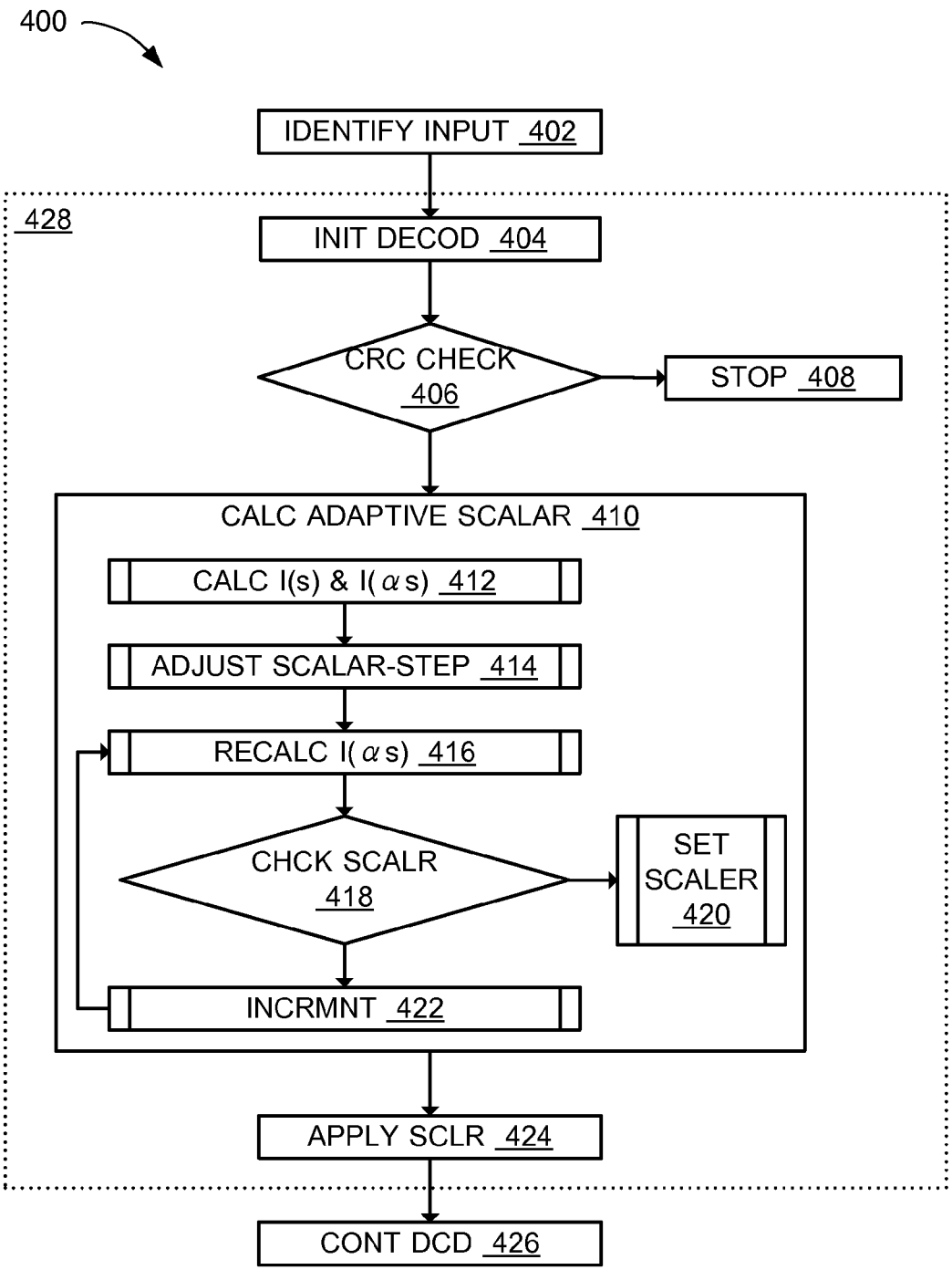
FIG. 4 is a detailed flow of the communication system.

Referring now to FIG. 4, therein is shown a detailed flow 400 of the communication system 100. The detailed flow 400 can be for generating the dynamic scalar 324 of FIG. 3 including the dynamic base scalar 326 of FIG. 3.

The detailed flow 400 can include identifying input in a box 402. The detector module 304 of FIG. 3, the arrangement module 318 of FIG. 3, or a combination thereof can identify input to the scaling module 316 of FIG. 3 as the detection result 132 of FIG. 1, the channel estimate 130 of FIG. 1, the modulation scheme 120 of FIG. 1, the decoding input 134 of FIG. 1, or a combination thereof as described above.

The detailed flow 400 can pass to initial decoding in a box 404. The decoder module 308 of FIG. 3 can perform the initial decoding to calculate an initial instance of the decoding result 136 of FIG. 1 as described above.

The detailed flow 400 can pass to CRC check in a box 406. The validation module 322 of FIG. 3 can perform the CRC check as described above.

The detailed flow 400 can pass to stop in a box 408. The validation module 322 can stop the processing of the receiver signal 128 of FIG. 1 when the error check passes, and return the candidate bits as the content replication 142 of FIG. 1 corresponding to and estimating the communication content 108.

If the error check does not pass, the detailed flow 400 can pass to calculate adaptive scalar in a box 410. The base module 332 can perform the calculate adaptive scalar process as described above. The calculate adaptive scalar process can be iterative process for generating the dynamic base scalar 326 of FIG. 3.

The calculate adaptive scalar process can include calculate I(s) and I($\alpha$s) in a box 412 for initializing the candidate scalar 336 of FIG. 3 and the step size 338 of FIG. 3. The base module 332 can calculate the candidate product 340 of FIG. 3 and the adjacent product 342 of FIG. 3 corresponding to the initial instances of the candidate scalar 336 and the step size 338 as described above.

The calculate adaptive scalar process can include adjust scalar-step in a box 414 for adjusting the candidate scalar 336 and the step size 338 based on comparing the candidate product 340 and the adjacent product 342 as described above. The recalculate I($\alpha$s) in a box 416 can be for recalculating the adjacent scalar based on the adjusted instance of the candidate scalar 336 and the step size 338 as described above.

The calculate adaptive scalar process can include check scalar in a box 418 for comparing the candidate product 340 and the adjacent product 342 after the updated calculations. The base module 332 can perform set scalar in a box 420 to generate the dynamic base scalar 326 or increment in a box 422 to adjust the candidate scalar 336 and the step size 338 to repeat the recalculate I($\alpha$s) in the box 416 based on the comparison as described above.

Once the dynamic base scalar 326 is generated, the detailed flow 400 can pass to apply scalar in a box 424. The base module 332 can perform the apply scalar by combining or multiplying the dynamic base scalar 326 with the detection result 132, the decoding input 134, the decoding result 136, or a combination thereof as described above.

The detailed flow 400 can pass to continue decoding in a box 426. The decoder module 308 can perform the continuance of the decoding process using the decoding input 134 updated using the dynamic base scalar 326 as described above.

The processes represented in boxes 404 through 424 can be grouped in a different box 428. The different box 428 can represent generation and application of the dynamic scalar 324 including the dynamic base scalar 326.

Figure 5:
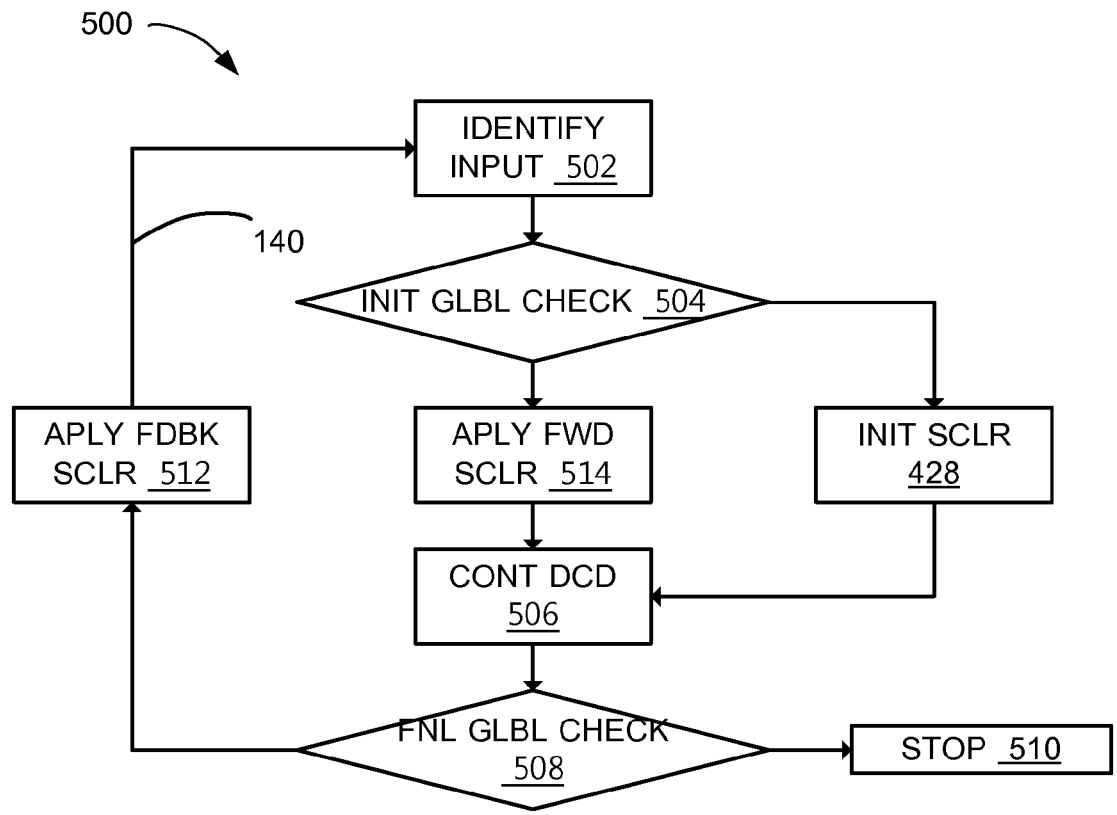
FIG. 5 is a further detailed flow of the communication system.

Referring now to FIG. 5, therein is shown a further detailed flow 500 of the communication system 100. The further detailed flow 500 can be for generating the dynamic scalar 324 of FIG. 3 including the feedback scalar 330 of FIG. 3, the forward scalar 328 of FIG. 3, or a combination thereof.

The detailed flow 500 can include identifying input in a box 502. The detector module 304 of FIG. 3, the arrangement module 318 of FIG. 3, or a combination thereof can identify input to the scaling module 316 of FIG. 3 as the detection result 132 of FIG. 1, the channel estimate 130 of FIG. 1, the modulation scheme 120 of FIG. 1, the decoding input 134 of FIG. 1, or a combination thereof as described above.

The detailed flow 500 can pass to initial global iteration check in a box 504. The scaling module 316 can perform the initial global iteration check. The scaling module 316 can use the base module 332 of FIG. 3 to perform an initial scalar generation in a box 428 as described in the different box 428 of FIG. 4 for representing generation and application of the dynamic scalar 324 including the dynamic base scalar 326 for the first global iteration 312 of FIG. 3.

The detailed flow 500 can pass to continue decoding in a box 506, similar to the box 426 of FIG. 4. The detailed flow 500 can pass to final global iteration check in a box 508 after the decoding process. The decoder module 308 of FIG. 3, the modification module 306 of FIG. 3, or a combination thereof can perform the final global iteration check.

The detailed flow 500 can pass to stop in a box 510 when the global iteration count 310 of FIG. 3 indicates the last global iteration 314 for stopping the detection-decoding process. Otherwise, the detailed flow 500 can pass to apply feedback scalar in a box 512. The adjustment module 334 of FIG. 3 can use the reverse module 350 of FIG. 3 to generate and apply the dynamic scalar 324 including the feedback scalar 330 as described above.

The detailed flow can pass back to the identify input in the box 502 through the iterative-feedback mechanism 140. The detector module 304 can use the detection feedback-input based on the feedback scalar 330 to perform the detection process after the first global iteration 312.

The detailed flow can pass to the initial global iteration check in the box 504, and then to apply forward scalar in a box 514 for the global iteration count 310 after the first global iteration 312. The adjustment module 334 can use the forward module 348 of FIG. 3 to generate and apply the dynamic scalar 324 including the forward scalar 328 as described above. The iterative process in the flow 500 can continue to the continue decoding in the box 506.

Figure 6:
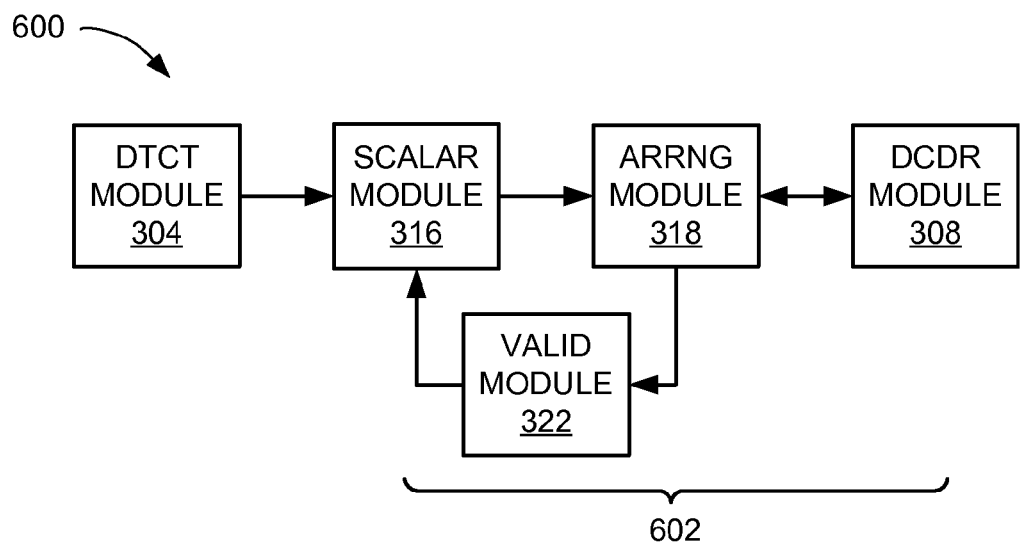
FIG. 6 is an exemplary arrangement of the control flow of the communication system.

Referring now to FIG. 6, therein is shown an exemplary arrangement 600 of the control flow 300 of FIG. 3 of the communication system 100. The communication system 100 can have the detector module 304 directly coupled to the scalar module 316, and the scalar module 316 can be directly coupled to the arrangement module 318. The arrangement module 318 can be directly coupled to the decoder module 308 and the validation module 322. The validation module 322 can be further directly coupled to the scalar module 316. The modules can be directly coupled without any other intervening modules or structures there-between.

The exemplary arrangement 600 can exemplify the detailed flow 400 of FIG. 4, the control flow 300, or a combination thereof. The exemplary arrangement 600 can be for generating the dynamic scalar 324 of FIG. 3 including the dynamic base scalar 326 of FIG. 3.

The exemplary arrangement 600 can have a scalar-decoding loop 602. The scalar-decoding loop 602 is a mechanism for providing the decoding result 136 of FIG. 1 to the scalar module 316. The scalar-decoding loop 602 can include a feedback loop implemented with wire or conductive structure, digital or software logic or steps, hardware devices, software loops, or a combination thereof. The scalar-decoding loop 602 can be used during the decoding process.

For example, the scalar module 316 could pass the control flow 300 to the arrangement module 318 for processing the detection result 132 of FIG. 1, the decoding input 134 of FIG. 1, or a combination thereof for the first global iteration 312 of FIG. 3. The decoder module 308 can initially decode the receiver signal 128 of FIG. 1 using the decoding input 134.

Continuing with the example, the initial instance of the decoding result 136 can be provided to the arrangement module 318 for processing, then to the validation module 322 for error checking process, and then fed back to the scalar module 316 through the scalar-decoding loop 602. The scalar module 316 can use the feedback value for the decoding result 136 or a derivation thereof to calculate the dynamic scalar 324 including the dynamic base scalar 326 as described above. The generation and application of the dynamic scalar 324 including the dynamic base scalar 326 can be performed per each instance of the bit channel 144 utilizing the scalar-decoding loop 602.

Figure 7:
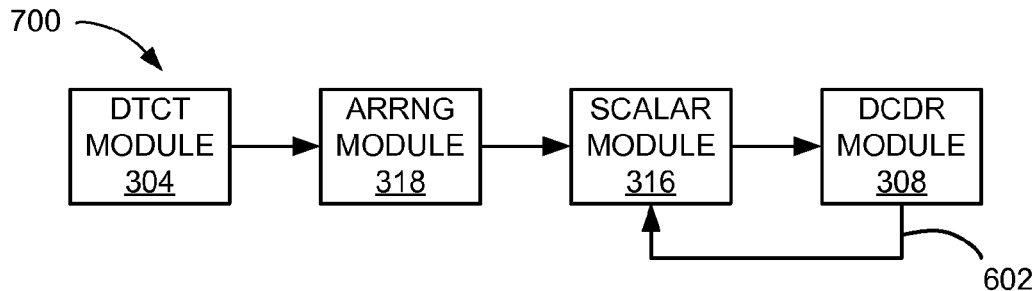
FIG. 7 is an alternative exemplary arrangement of the control flow of FIG. 3 of the communication system.

Referring now to FIG. 7, therein is shown an alternative exemplary arrangement 700 of the control flow 300 of FIG. 3 of the communication system 100. The communication system 100 can have the detector module 304 directly coupled to the arrangement module 318, which can be directly coupled to the scalar module 316. The scalar module 316 can be directly coupled to the decoder module 308. The modules can be directly coupled without any other intervening modules or structures there-between.

The exemplary arrangement 700 can exemplify the detailed flow 400 of FIG. 4, the control flow 300, or a combination thereof. The exemplary arrangement 700 can be for generating the dynamic scalar 324 of FIG. 3 including the dynamic base scalar 326 of FIG. 3.

The exemplary arrangement 700 can have the scalar-decoding loop 602 from the decoder module 308 to the scalar module 316. For exemplary arrangement 700, the communication system 100 can descramble and de-interleave the detection result 132 of FIG. 1 before passing through the scalar module 316. The interactions between the decoder module 308 and the scalar module 316 can be direct. Further, the modification module 306 of FIG. 3 can process the decoding input 134 of FIG. 1 for scalar values without the scrambling or interleaving process in the scalar module 316 for processing the feedback information.

For the exemplary arrangement 700, the generation and application of the dynamic scalar 324 including the dynamic base scalar 326 can be performed per each instance of the bit channel 144 utilizing the scalar-decoding loop 602. Alternatively, the generation and application of the dynamic scalar 324 including the dynamic base scalar 326 can be performed using a uniform value of the dynamic scalar 324 including the dynamic base scalar 326 for all instances of the bit channel 144.

Figure 8:
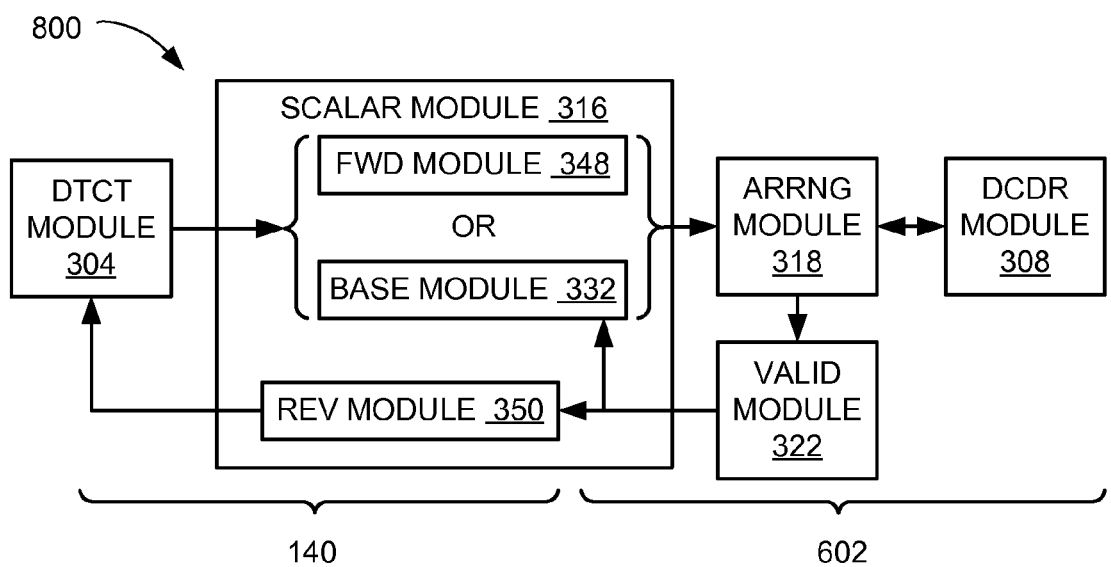
FIG. 8 is a further alternative exemplary arrangement of the control flow of the communication system.

Referring now to FIG. 8, therein is shown a further alternative exemplary arrangement 800 of the control flow 300 of FIG. 3 of the communication system 100. The communication system 100 can have the detector module 304 directly coupled to the scalar module 316, and the scalar module 316 can be directly coupled to the arrangement module 318. The arrangement module 318 can be directly coupled to the decoder module 308 and the validation module 322. The validation module 322 can be further directly coupled to the scalar module 316. The modules can be directly coupled without any other intervening modules or structures therebetween.

The exemplary arrangement 800 can exemplify the detailed flow 400 of FIG. 4, the detailed flow 500 of FIG. 5, the control flow 300, or a combination thereof. The exemplary arrangement 800 can be for generating the dynamic scalar 324 of FIG. 3 including the dynamic base scalar 326 of FIG. 3, the forward scalar 328 of FIG. 3, the feedback scalar 330 of FIG. 3, or a combination thereof.

The exemplary arrangement 800 can have the scalar-decoding loop 602 for feeding back the decoding result 136 or a derivation thereof to the base module 332. The scalar-decoding loop 602 can be used during the decoding process.

For example, the scalar module 316 can use the base module 332 for the first global iteration 312 of FIG. 3. The base module 332 can use the decoding result 136 of FIG. 1 or a derivation thereof provided through the scalar-decoding loop 602 to generate the dynamic scalar 324 including the dynamic base scalar 326.

Continuing with the example, once the decoding process finishes, the scalar module 316 can use the reverse module 350 to generate and apply the dynamic scalar 324 including the feedback scalar 330 of FIG. 3, and provide the result to the detector module 304 through the iterative-feedback mechanism 140. After the corresponding detection process, the scalar module 316 can use the forward module 348 after the first global iteration 312 to generate and apply the dynamic scalar 324 including the feedback scalar 330 of FIG. 3 instead of the base module 332.

Figure 9:
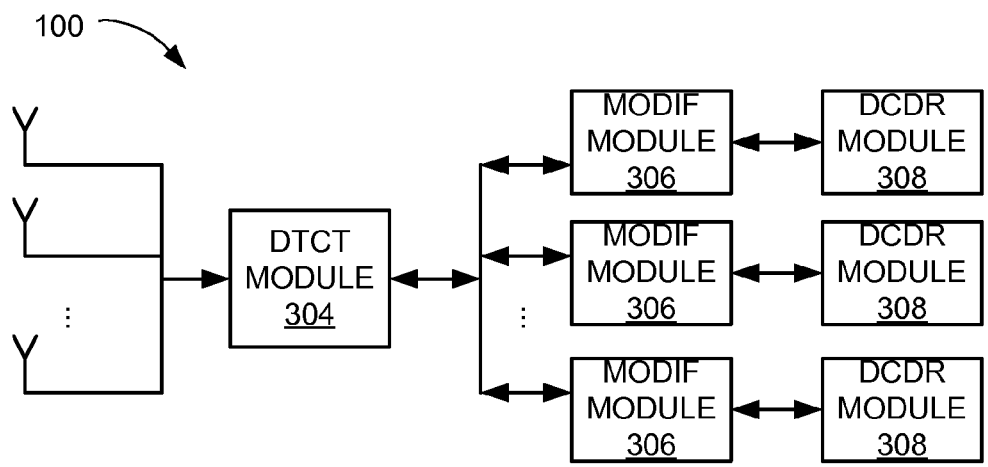
FIG. 9 is an example illustration of the communication system with a multi-stream communication mechanism.

Referring now to FIG. 9, therein is shown an example illustration of the communication system 100 with a multi-stream communication mechanism. The communication system 100 can include the multi-stream communication mechanism, such as for MIMO type of communication. For example, the first device 102 of FIG. 1, the second device 106 of FIG. 1, or a combination thereof can include the first antenna unit 217 of FIG. 2, the second antenna unit 237 of FIG. 2, or a combination thereof can include more than one receiving or transmitting structures therein.

The communication system 100 can include a shared instance of the detector module 304 can generate the detection result 132 of FIG. 1 of all data streams for the MIMO communication. Each of the data streams can be further processed, as described above, by individual and independent instances of the dynamic scalar 324 corresponding to each of the data streams. The decoder module 308 can further process each of the data streams separately.

The communication system 100 can include multiple instances of the modification module 306, the decoder module 308, or a combination thereof, each for processing an instance of the data streams. The communication system 100 can also include one instance of the modification module 306, the decoder module 308, or a combination thereof, and iteratively processing each instance of the data stream with the modification module 306, the decoder module 308, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
    an antenna configured to receive a receiver signal for representing a transmitter signal corresponding to a sequence of bits intended for communication; and
    a communication unit, coupled to the antenna, configured to:
        calculate a decoding result based on the receiver signal,
        generate a dynamic scalar based on the decoding result, the dynamic scalar for representing a set of values with each value corresponding to one bit within the sequence of bits of the transmitter signal represented in the receiver signal, and
        generate a content replication based on the dynamic scalar for communicating with a device.

2. The system as claimed in claim 1 wherein the communication unit is further configured to:
    calculate a candidate product and an adjacent product based on the decoding result; and
    generate the dynamic scalar based on comparing the candidate product to the adjacent product.

3. The system as claimed in claim 1 wherein the communication unit is configured to generate the dynamic scalar including:
    a dynamic base scalar corresponding to an initial global iteration generated based on the decoding result; and
    a forward scalar generated based on the dynamic base scalar after the initial global iteration for calculating the decoding result.

4. The system as claimed in claim 1 wherein the communication unit is configured to generate the dynamic scalar including:
    a dynamic base scalar corresponding to an initial global iteration generated based on the decoding result; and
    a feedback scalar generated based on the dynamic base scalar for calculating a detection result.

5. The system as claimed in claim 1 wherein the communication unit is configured to generate the dynamic scalar after receiving the receiver signal and calculating the decoding result.

6. The system as claimed in claim 1 wherein:
    the antenna is configured to receive the receiver signal for representing a communication content; and the communication unit is further configured to:
calculate a detection result based on the receiver signal;
generate the dynamic scalar based on the detection result;
combine the detection result with the dynamic scalar for decoding the receiver signal; and
generate the content replication for estimating the communication content.

7. The system as claimed in claim 6 wherein the communication unit is further configured to:
calculate a candidate product, corresponding to a candidate scalar, and an adjacent product, corresponding to a step size, based on the decoding result;
determine the candidate scalar and the step size based on comparing the candidate product and the adjacent product; and
generate the dynamic scalar including a dynamic base scalar generated based on the candidate scalar and the step size maximizing the candidate product.

8. The system as claimed in claim 6 wherein the communication unit is further configured to:
generate the dynamic scalar including a dynamic base scalar corresponding to an initial global iteration; and
combine the detection result with the dynamic base scalar for calculating the decoding result corresponding to the initial global iteration.

9. The system as claimed in claim 6 wherein the communication unit is further configured to:
generate the dynamic scalar including a dynamic base scalar corresponding to an initial global iteration;
generate the dynamic scalar including a forward scalar based on the dynamic base scalar after the initial global iteration; and
combine the detection result and the forward scalar for calculating the decoding result after the initial global iteration.

10. The system as claimed in claim 6 wherein the communication unit is further configured to:
generate the dynamic scalar including a dynamic base scalar corresponding to an initial global iteration;
generate the dynamic scalar including a feedback scalar based on the dynamic base scalar; and
combine the detection result and the feedback scalar for calculating a different instance of the detection result.

11. A method of operation of a communication system comprising:
receiving a receiver signal using an antenna, the receiver signal for representing a transmitter signal corresponding to a sequence of bits intended for communication;
calculating a decoding result based on the receiver signal;
generating a dynamic scalar using a communication unit based on the decoding result, the dynamic scalar for representing a set of values with each value corresponding to one bit within the sequence of bits of the transmitter signal represented in the receiver signal; and
generating a content replication based on the dynamic scalar for communicating with a device.

12. The method as claimed in claim 11 wherein generating the dynamic scalar includes:
calculating a candidate product and an adjacent product based on the decoding result; and
generating the dynamic scalar based on comparing the candidate product to the adjacent product.

13. The method as claimed in claim 11 wherein generating the dynamic scalar includes:
generating a dynamic base scalar corresponding to an initial global iteration based on the decoding result; and
generating a forward scalar based on the dynamic base scalar after the initial global iteration for calculating the decoding result.

14. The method as claimed in claim 11 wherein generating the dynamic scalar includes:
generating a dynamic base scalar corresponding to an initial global iteration based on the decoding result; and
generating a feedback scalar based on the dynamic base scalar for calculating a detection result.

15. The method as claimed in claim 11 wherein generating the dynamic scalar includes generating the dynamic scalar after receiving the receiver signal and calculating the decoding result.

16. A non-transitory computer readable medium including executable instructions therein for execution by a processor for performing a method of operating a communication system comprising:
identifying a receiver signal for representing a transmitter signal corresponding to a sequence of bits intended for communication;
calculating a decoding result based on the receiver signal;
generating a dynamic scalar based on the decoding result, the dynamic scalar for representing a set of values with each value corresponding to one bit within the sequence of bits of the transmitter signal represented in the receiver signal; and
generating a content replication based on the dynamic scalar for communicating with a device.

17. The non-transitory computer readable medium as claimed in claim 16 wherein generating the dynamic scalar includes:
calculating a candidate product and an adjacent product based on the decoding result; and
generating the dynamic scalar based on comparing the candidate product to the adjacent product.

18. The non-transitory computer readable medium as claimed in claim 16 wherein generating the dynamic scalar includes:
generating a dynamic base scalar corresponding to an initial global iteration based on the decoding result; and
generating a forward scalar based on the dynamic base scalar after the initial global iteration for calculating the decoding result.

19. The non-transitory computer readable medium as claimed in claim 16 wherein generating the dynamic scalar includes:
generating a dynamic base scalar corresponding to an initial global iteration based on the decoding result; and
generating a feedback scalar based on the dynamic base scalar for calculating a detection result.

20. The non-transitory computer readable medium as claimed in claim 16 wherein generating the dynamic scalar includes generating the dynamic scalar after receiving the receiver signal and calculating the decoding result.

* * * * *